United States Patent [19]

Masuda

[11] Patent Number: 4,969,430

[45] Date of Patent: Nov. 13, 1990

[54] LUBRICATION SYSTEM FOR TWO STROKE ENGINE

[75] Inventor: Tatsuyuki Masuda, Iwata, Japan

[73] Assignee: Yamaha Hatsudoki Kabushiki Kaisha, Iwata, Japan

[21] Appl. No.: 470,962

[22] Filed: Jan. 26, 1990

[30] Foreign Application Priority Data

Feb. 1, 1989 [JP] Japan .................. 1-20819

[51] Int. Cl.⁵ .............................. F01M 1/00
[52] U.S. Cl. .................. 123/196 R; 123/197 AC; 184/6.5
[58] Field of Search ............ 123/196 R, 196 W, 56 C, 123/197 AC, 90.34; 184/6.8

[56] References Cited

U.S. PATENT DOCUMENTS

| | | | |
|---|---|---|---|
| 3,361,007 | 1/1968 | Bel santi et al. ................. | 184/6.8 |
| 4,201,176 | 5/1980 | Lustgarten ..................... | 123/196 W |
| 4,359,018 | 11/1982 | Wade ............................ | 123/90.34 |
| 4,515,110 | 5/1985 | Perry ............................ | 123/196 R |
| 4,584,972 | 4/1986 | Jayne et al. .................... | 123/56 C |
| 4,622,933 | 11/1986 | Fukuo et al. ................... | 123/196 R |
| 4,776,310 | 10/1988 | Gray ............................ | 123/197 AC |
| 4,785,790 | 11/1988 | Pfeffer et al. .................. | 123/196 R |
| 4,896,634 | 1/1990 | Kronich ......................... | 123/90.34 |

Primary Examiner—E. Rollins Cross
Attorney, Agent, or Firm—Ernest A. Beutler

[57] ABSTRACT

A lubricating system for a two cycle crankcase compression internal engine wherein lubricant is delivered to a main bearing of the crankshaft for its lubrication. The crankshaft has a throw adjacent this bearing and an oil receiving groove in a face of the throw receives oil leaking from the bearing. A cross drilled passageway delivers the accumulated oil by centrigfugal force to the connecting rod journal for its lubrication.

5 Claims, 2 Drawing Sheets

LUBRICATION SYSTEM FOR TWO STROKE ENGINE

BACKGROUND OF THE INVENTION

This invention relates to a lubrication system for a two stroke engine and more particularly to an improved arrangement for lubricating the connecting rod journal of a reciprocating machine.

It is well known that most machines and particularly reciprocating machines require lubrication of their contacting elements so as to reduce wear, provide long life and also to cool certain of the components. Many of these machines such as four cycle internal combustion engines, are provided with closed lubricating systems wherein lubricant is contained within a reservoir, circulated through the components of the engine for its lubrication and returned back to this reservoir for reuse. However, with some types of machines such as two cycle engines, such closed lubricating systems are not normally employed. One of the advantages of the a two-cycle engine is its simplicity and particularly its simplicity of its lubricating system. However, with many types of two cycle engines the lubricating system can give rise to certain difficulties.

For example, if lubricant is mixed with the fuel, as is conventional with spark ignited engines, providing the adequate amount of lubricant to the various areas of the engine to be lubricated can be difficult. In addition, the mixing of lubricant with the fuel can give rise to problems of objectional exhaust emission. Although separate lubricating systems have been proposed for two cycle engines, the separate systems do have mid-point leakage that can result in the lack of adequate lubricant to some components of the engine unless excess lubricant is supplied. Again, this gives rise to certain problems with exhaust emission and particularly smoke problems.

It is, therefore, a principal object of this invention to provide an improved lubricating system for a reciprocating machine.

It is a further object of this invention to provide an improved lubricating system for a reciprocating machine and specifically a two cycle internal combustion engine.

It is a yet further object of this invention to provide an improved arrangement for insuring adequate lubrication to all components of a reciprocating machine without resulting in excess oil consumption.

SUMMARY OF THE INVENTION

This invention is adapted to be embodied in a lubricating system for a reciprocating machine having a crankshaft journaled for rotation by a bearing. A throw on the crankshaft is positioned adjacent the bearing and a connecting rod is journaled on this throw. Means are provided for delivering lubricant to the bearing. A lubricant receiving groove is formed in the crankshaft adjacent the bearing and receives lubricant leaking therefrom. A lubricant delivery passage extends from the lubricant receiving groove to the throw for lubricating the connecting rod journal.

DETAILED DESCRIPTION OF THE PREFERRED EMBODIMENT OF THE INVENTION

Figure 1:
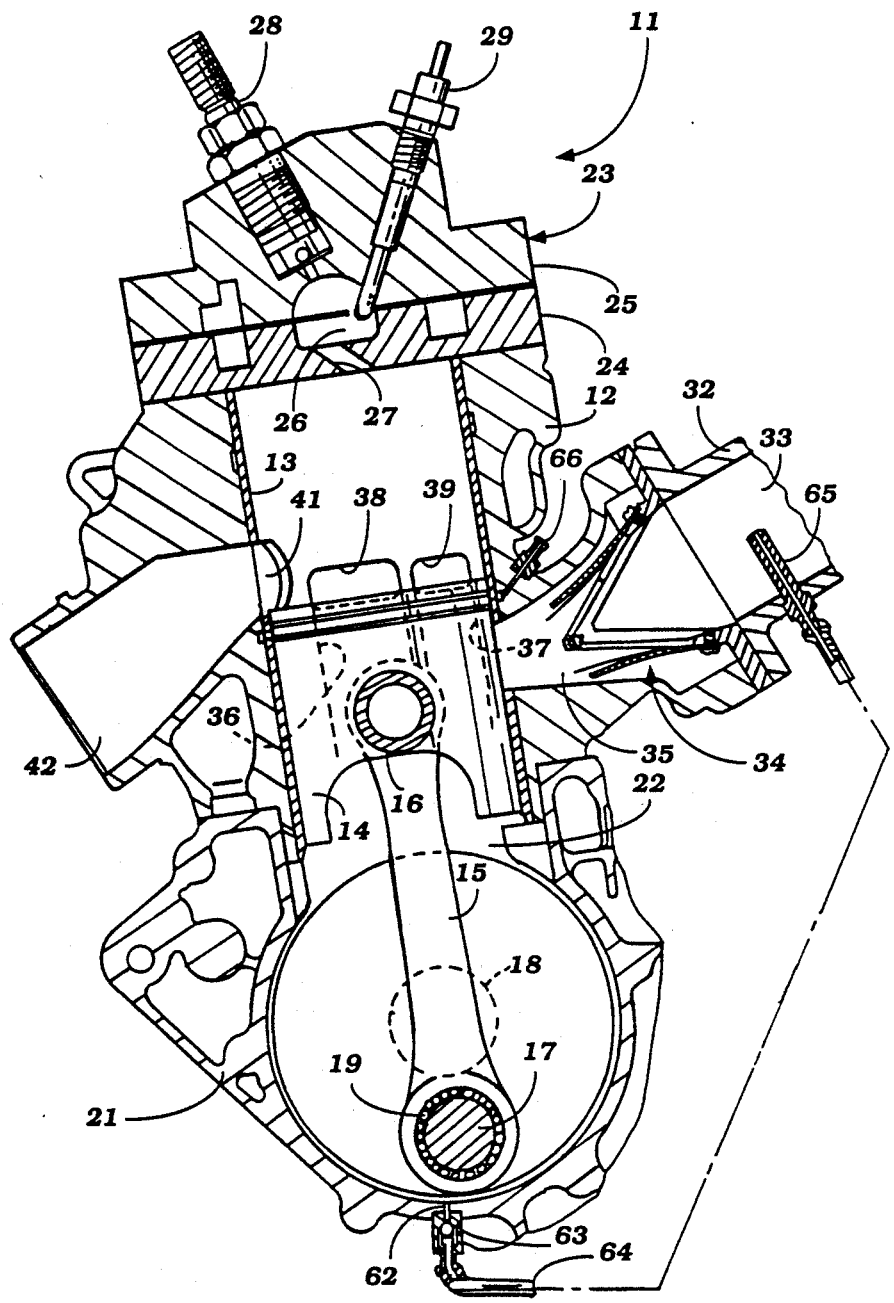
FIG. 1 is a cross sectional view taken through a single cylinder of an internal combustion engine constructed in accordance with an embodiment of the invention.

Referring now in detail to the drawings, a two cycle, crankcase compression, diesel engine is identified generally by the reference numeral 11. The engine 11 is depicted in cross section through only a single one of its cylinders. It should be readily apparent to those skilled in the art how the invention can be practiced in conjunction with multiple cylinder engines having any type of cylinder configuration.

The engine 11 is comprised of a cylinder block 12 having one or more cylinder bores in which pressed in cylinder liners 13 are provided. A piston 14 is supported for reciprocation in each cylinder liner 13 and is connected to the upper end of a connecting rod 15 by means of a piston pin 16. The lower end of the connecting rod 15 is connected to a throw 17 of a crankshaft 18 by means of a suitable bearing assembly, a roller bearing type assembly 19 is utilized in the depicted embodiment. The crankshaft 18 is supported for rotation relative in a manner to be described to the cylinder block 12 and to a crankcase 21 that is affixed to the cylinder block in a known manner.

A crankcase chamber 22 is formed below the piston 14. As is conventional in this type of engine, the individual crankcase chambers 22 associated with each of the cylinder bores 13 are sealed from each other in an appropriate manner.

A cylinder head assembly, indicated that generally by the reference 23 and comprised of a lower spaced plate 24 and a main portion 25 are affixed to the cylinder block 12 in an appropriate manner. The spacer plate 24 and main portion 25 form a swirl type pre-chamber 26 that communicates with the main chamber formed above the head of the piston 14 through a throat section 27.

A fuel charge is admitted to the pre-chamber 26 by an injection nozzle 28 that is affixed to the cylinder head assembly 23 in a known manner. A glow plug assembly 29 is also affixed to the head assembly 23 and extends into the pre-chamber 26 for at least starting operation.

An air charge indicated is delivered to the crankcase chambers 22 by means including an intake manifold 32 having individual intake passages 33 each serving a respective one of the chambers 22. A reed type check valve assembly, indicated generally by the reference number 34 is clamped between the intake manifold 32 and an intake passage 35 formed in the cylinder block 12 and which communicates at its downstream end . with the crankcase chamber 22 when the piston is above its bottom dead center by a more than predetermined amount.

The air charge which as been admitted to the crankcase chambers 22 is compressed therein and is then transferred by a plurality of scavenge of transfer passages 36 and 37 to the area above the piston 14 through respective scavenge ports 38 and 39 At the appropriate position, fuel is injected into the prechamber 26 from the nozzle 28 and will burn and then issue into the main combustion chamber for expansion. The burnt charge is then discharged to the atmosphere through one or more exhaust ports 41 formed in the cylinder liner 13 and which communicate with exhaust passages 42 formed in the cylinder block 12.

Figure 2:
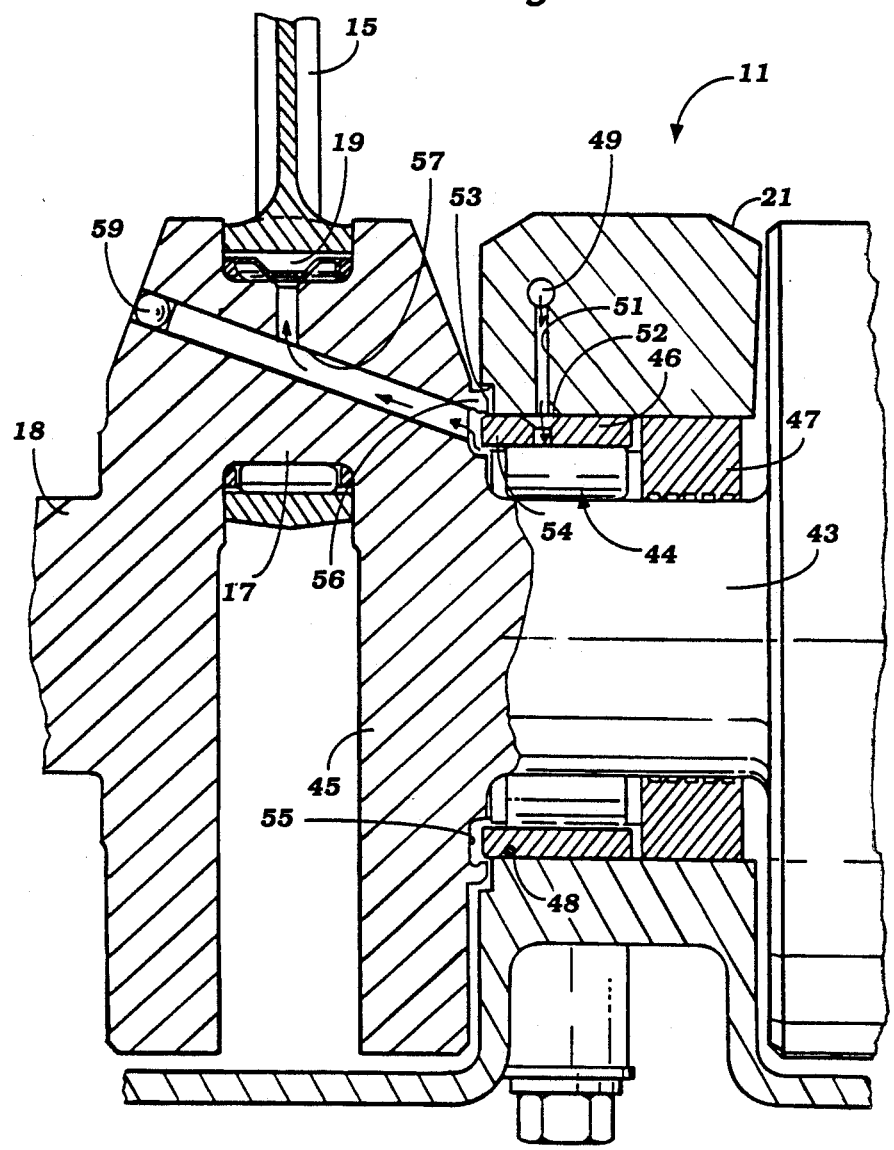
FIG. 2 is an enlarged cross sectional view taken through a plane perpendicular to the plane of FIG. 1 and shows the lubricating arrangement for the crankshaft and connecting rod journal.

Referring now primarily to FIG. 2, the manner in which the crankshaft 18 is journaled and the lubrication system for the bearing assembly journaling the crankshaft and the bearing 19 will be described. It should be noted that the crankshaft 18 has a main bearing portion 43 that is journaled within the crankcase 21 by means of a roller bearing assembly 44. The bearing assembly 44 is disposed adjacent a cheek 45 of the crankshaft 18. The cheek 45 has a section that is larger in diameter than that of the bearing 44 for a reason which will become apparent.

The bearing 44 has an outer race 46 that is contained within the inner end of a bore formed by the crankcase 21. A labyrinth type oil seal 47 is disposed at the outer end of this bore from the bearing 44. The outer race 46 of the bearing 44 is held in place by a retainer ring 48.

The engine 11 is provided with a separate lubricating system that includes a source of lubricant and lubricating pump (not shown) that delivers lubricant to various components of the engine to be lubricated. This includes an arrangement for lubricating the main bearing 44 and also the connecting rod bearing 19 which will now be described.

A main oil gallery 49 is formed in the crankcase 21 and receives lubricant under pressure. A plurality of delivery passages 51 intersect the gallery 49 and deliver oil to an oil delivery opening 52 in the bearing outer race 46. This lubricant then flows and lubricates the rollers of the bearing 44.

It should be noted that there is formed a counter bore 53 around the inner end of the bore in which the bearing 44 is received. The outer race 46 has a portion 54 that extends into this counter bore. It should be noted that the cheek 45 of the crankshaft has a circumferential oil retaining groove 55 that is defined by a circumferential lip 56 that registers with the bearing 44. Hence, any lubricant which escapes from the bearing 44 will be directed by the seal 47 inwardly and will flow into this oil retaining groove 55.

A cross drilled passageway 57 extends through the cheek 45 and throw 17 and is closed at its opposite end by a plug 59. Oil will be drawn from the retaining groove 55 and transferred by centrifugal force into the cross drilled passageway 57. A delivery passage 61 intersects this passageway and the bearing 19 so as to lubricant this bearing. Hence, excess lubricant will be delivered to the bearing and will not be permitted to enter into the combustion chamber and exit as smoke in the exhaust.

Because of the fact that there would be no lubricant supplied to the intake passages, the closing of the reeds of the check valve 34 will be accompanied by certain noise. To avoid this noise, there is provided a drain passageway 62 that extends from a lower point in the crankcase chamber 22 where excess or condensed lubricant may collect. A ball type check valve 63 communicates the drain passageway 62 with a conduit 64 which, in turn, extends to a spray nozzle 65 positioned centrally n the manifold passageway 33 approximately at the ape of the valve 34. As a result, small amounts of lubricant will be drawn from the crankcase chamber 22 through the check valve 62 and conduit 63 for discharge as shown in FIG. 1. This lubricant will accumulate on the elements of the valves 34. As a result, when the valve elements of the valve 34 move to their closed position, this accumulated lubricant will provide a damping or silencing effect and thus avoid the noise which would otherwise occur. However, since the main supply of lubricant is not supplied to the intake passageways 33 there will be no likelihood of blue smoke in the exhaust of the engine under any running conditions.

The lubrication system also includes spray nozzles 66 that spray lubricant through an opening in the liner 13 to lubricate the external surface of the piston 14.

It should be readily apparent from the foregoing description that the lubrication system for the engine 11 is highly effective and it will be insured that the crankshaft bearing and connecting rod bearings will be adequately lubricated without excess lubricant flow to the engine that could cause smoke in the exhaust.

It is to be understood that the foregoing description is that of a preferred embodiment of the invention and various changes and modifications may be made without departing from the spirit and scope of the invention, as defined by the appended claims.

I claim:

1. A lubricating system for a reciprocating machine having a crankshaft journaled for rotation within a bearing, a throw on said crankshaft adjacent said bearing, a connecting rod journaled on said throw, means for delivering lubricant to said bearing, a lubricant receiving groove formed in said crankshaft adjacent said bearing for receiving lubricant leaking therefrom and a lubricant delivery passage extending from said lubricant receiving groove to the connecting rod journal for lubricating said connecting rod.

2. A lubricating system for a reciprocating machine as set forth in claim 1, wherein the reciprocating machine comprises a two cycle crankcase compression internal combustion engine.

3. A lubricating system for a reciprocating machine as set forth in claim 2 wherein the bearing is received within a bore of the crankshaft of the machine and the bore is formed with a counterbore adjacent the crankshaft throw, the crankshaft throw having a lip extending into said counterbore and defining the oil receiving groove.

4. A lubricating system for a reciprocating machine as set forth in claim 3, wherein the reciprocating machine comprises a two cycle crankcase compression internal combustion engine.

5. A lubricating system for a reciprocating machine as set forth in claim 4 wherein the lubricant delivery passage comprises a cross drilling in the crankshaft throw extending from the oil receiving groove to the other side of the throw enclosed by a plug, said cross drilling being intersected by a further drilling extending to the connecting rod journal.

* * * * *

Disclaimer

4,969,430—*Tatsuyuki Masuda*, Iwata, Japan. LUBRICATION SYSTEM FOR TWO STROKE ENGINE. Patent dated Nov. 13, 1990. Disclaimer filed July 19, 1991, by the assignee, Yamaha Hatsudoki Kabushiki Kaisha.

Hereby enters this disclaimer to claims 1 and 2 of said patent.

[ *Official Gazette October 8, 1991* ]